US012675286B2

(12) United States Patent
Beaty et al.

(10) Patent No.: US 12,675,286 B2
(45) Date of Patent: Jul. 7, 2026

(54) SIMPLIFIED SOFTWARE SERVICE CONFIGURATION USING ARTIFICIAL INTELLIGENCE

(71) Applicant: RedCritter Corp., Flower Mound, TX (US)

(72) Inventors: Robert M. Beaty, Flower Mound, TX (US); Randy M. Whelan, Coppell, TX (US); Erika D. Lambert, Flower Mound, TX (US); James L. Rockett, Jr., Carrollton, TX (US)

(73) Assignee: RedCritter Corp., Flower Mound, TX (US)

( * ) Notice: Subject to any disclaimer, the term of this patent is extended or adjusted under 35 U.S.C. 154(b) by 262 days.

(21) Appl. No.: 18/350,296

(22) Filed: Jul. 11, 2023

(65) Prior Publication Data
US 2025/0021328 A1     Jan. 16, 2025

(51) Int. Cl.
*G06F 9/44* (2018.01)
*G06F 8/71* (2018.01)

(52) U.S. Cl.
CPC ..................................... *G06F 8/71* (2013.01)

(58) Field of Classification Search
None
See application file for complete search history.

(56) References Cited

U.S. PATENT DOCUMENTS

| | | | | |
|---|---|---|---|---|
| 7,404,141 B1 * | 7/2008 | Giljum | .................. | G06F 16/958 |
| | | | | 715/229 |
| 8,214,802 B1 * | 7/2012 | Graves | ...................... | G06F 8/71 |
| | | | | 717/109 |
| 10,511,481 B1 * | 12/2019 | Castellanos | ......... | H04L 41/0883 |
| 2004/0219493 A1 * | 11/2004 | Phillips | .................... | G09B 5/06 |
| | | | | 434/350 |
| 2012/0185925 A1 * | 7/2012 | Barkie | .................. | G06F 21/572 |
| | | | | 726/7 |
| 2013/0289744 A1 * | 10/2013 | Bavar | .................... | A61B 5/681 |
| | | | | 700/9 |
| 2016/0291965 A1 * | 10/2016 | Li | ........................... | G06F 9/445 |
| 2020/0319877 A1 * | 10/2020 | Glazer | ...................... | G06N 5/04 |
| 2023/0028038 A1 * | 1/2023 | Hampton | ............. | G06Q 10/063 |
| 2024/0380653 A1 * | 11/2024 | Brocato | .................. | H04L 41/22 |

* cited by examiner

*Primary Examiner* — Lanny N Ung
(74) *Attorney, Agent, or Firm* — Kirton McConkie; Brian Tucker

(57) ABSTRACT
A simplified software service configuration using artificial intelligence is provided. A server can provide an application programming interface by which a user interface can submit information to be used for generating configurations for a software service. The server can add the information to a predefined AI prompt to create an AI prompt for submission to a third-party AI service. The server may also include example configurations and instructions in the AI prompt to be used by the AI service to generate the configurations. Once the configurations are generated, they can be presented to the user for confirmation and then used to configure the software service. In this way, a user can configure a software service by simply providing information.

16 Claims, 10 Drawing Sheets

SIMPLIFIED SOFTWARE SERVICE CONFIGURATION USING ARTIFICIAL INTELLIGENCE

CROSS-REFERENCE TO RELATED APPLICATIONS

N/A

BACKGROUND

Configuring software services can often be a complex and time-consuming process requiring an organization to navigate through numerous settings and options. This configuration process may also require the organization to make decisions based on specific requirements. Even if the organization has a tech-savvy administrator, the configuration process can be overwhelming and error prone and may therefore discourage the organization from using the software services or their full capabilities.

BRIEF SUMMARY

The present invention extends to methods, system and computer program products for providing a simplified software service configuration using artificial intelligence. A server can provide an application programming interface by which a user interface can submit information to be used for generating configurations for a software service. The server can add the information to a predefined AI prompt to create an AI prompt for submission to a third-party AI service. The server may also include example configurations and instructions in the AI prompt to be used by the AI service to generate the configurations. Once the configurations are generated, they can be presented to the user for confirmation and then used to configure the software service. In this way, a user can configure a software service by simply providing information.

In some embodiments, the present invention may be implemented as a method for providing a simplified software service configuration using AI. A user interface can be presented to a user. The user interface can request information to be used to configure a software service. The information can be received via the user interface. The information can be populated into an AI prompt. The AI prompt can be submitted to an AI service to request generation of configurations for the software service based on the information. The configurations can be received from the AI service. The configurations can be presented to the user. Confirmation of the configurations can be received from the user. The configurations can be stored and used to configure the software service.

In some embodiments, example configurations can be included in the AI prompt.

In some embodiments, instructions for generating the configurations can be included in the AI prompt.

In some embodiments, the instructions may specify that the configurations should be generated based on the example configurations and the information.

In some embodiments, the instructions may specify that the configurations should be selected from the example configurations based on the information.

In some embodiments, instructions for categorizing the configurations can be included in the AI prompt.

In some embodiments, receiving confirmation of the configurations from the user may include receiving one or more modifications to the configurations from the user.

In some embodiments, receiving confirmation of the configurations from the user may include receiving a selection of less than all of the configurations.

In some embodiments, the information may include values of an organization such that the configurations are generated to align with the values.

In some embodiments, the information may be a mission statement.

In some embodiments, the configurations may include awards that the software service is to make available to users.

In some embodiments, the configurations may include groupings of users within the software service.

In some embodiments, at least some of the configurations may include a name and a description that are generated by the AI service in response to the AI prompt.

In some embodiments, at least some of the configurations may include a category and an image may be selected for each of the at least some of the configurations based on the respective category.

In some embodiments, the present invention may be implemented as computer storage media storing computer executable instructions which when executed implement a method for providing a simplified software service configuration using AI. A user interface can be presented to a user. The user interface can request information about an organization. The information can be received via the user interface. The information can be populated into an AI prompt. The AI prompt can be submitted to an AI service to request generation of configurations for a software service based on the information about the organization. The configurations can be received from the AI service. The configurations can be presented to the user. Confirmation of the configurations can be received from the user. The configurations can be stored and used to configure the software service.

In some embodiments, the information may represent values of the organization such that the configurations are generated to align with the values of the organization.

In some embodiments, example configurations and instructions can be included in the AI prompt. The instructions can specify that at least some of the configurations should be generated based also on the example configurations.

In some embodiments, example configurations and instructions can be included in the AI prompt. The instructions can specify that at least some of the configurations should be selected from the example configurations.

In some embodiments, the present invention may be implemented by a server as a method for providing a simplified software service configuration using AI. The server can present an API. The API can be configured to receive information to be used to generate configurations for a software service. Information about an organization can be received via the API. The information can be populated into an AI prompt. Example configurations and instructions for generating configurations for the software service based on the information and the example configurations can also be included in the AI prompt. The AI prompt can be submitted to the AI service. The configurations can be received from the AI service. The configurations can be presented to the user. Confirmation of the configurations can be received from the user. The configurations can be stored and used to configure the software service.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
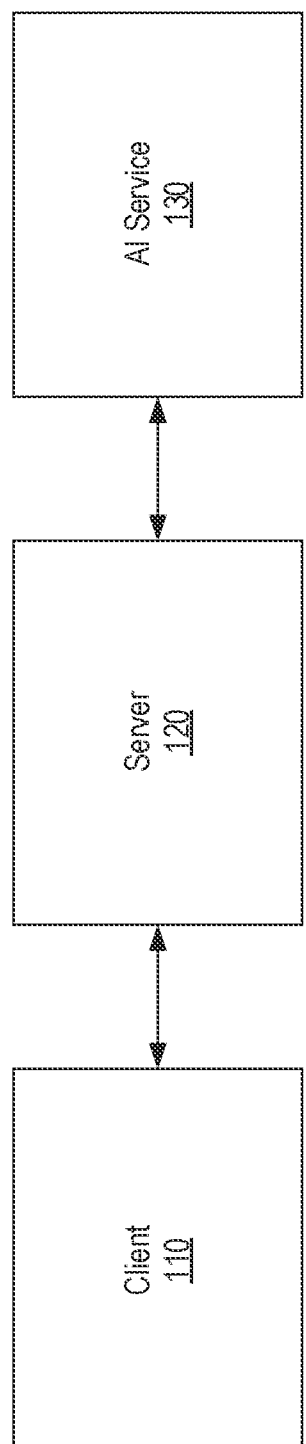
FIG. 1 illustrates an example computing environment in which one or more embodiments of the present invention may be implemented.

FIG. 1 provides an example of a computing environment 100 in which embodiments of the present invention may be implemented. Computing environment 100 includes one or more clients 110, one or more servers 120, and one or more AI services 130. Client 110 can represent any type of computing device that an organization or user may use to access a software service hosted on server 120. Server 120 can represent any arrangement of components on which a software service may be hosted. For example, server 120 could be a standalone server computing device or a cloud. AI service 130 can represent any service that provides access to AI functionality such as ChatGPT, Google Bard, etc.

Figure 2:
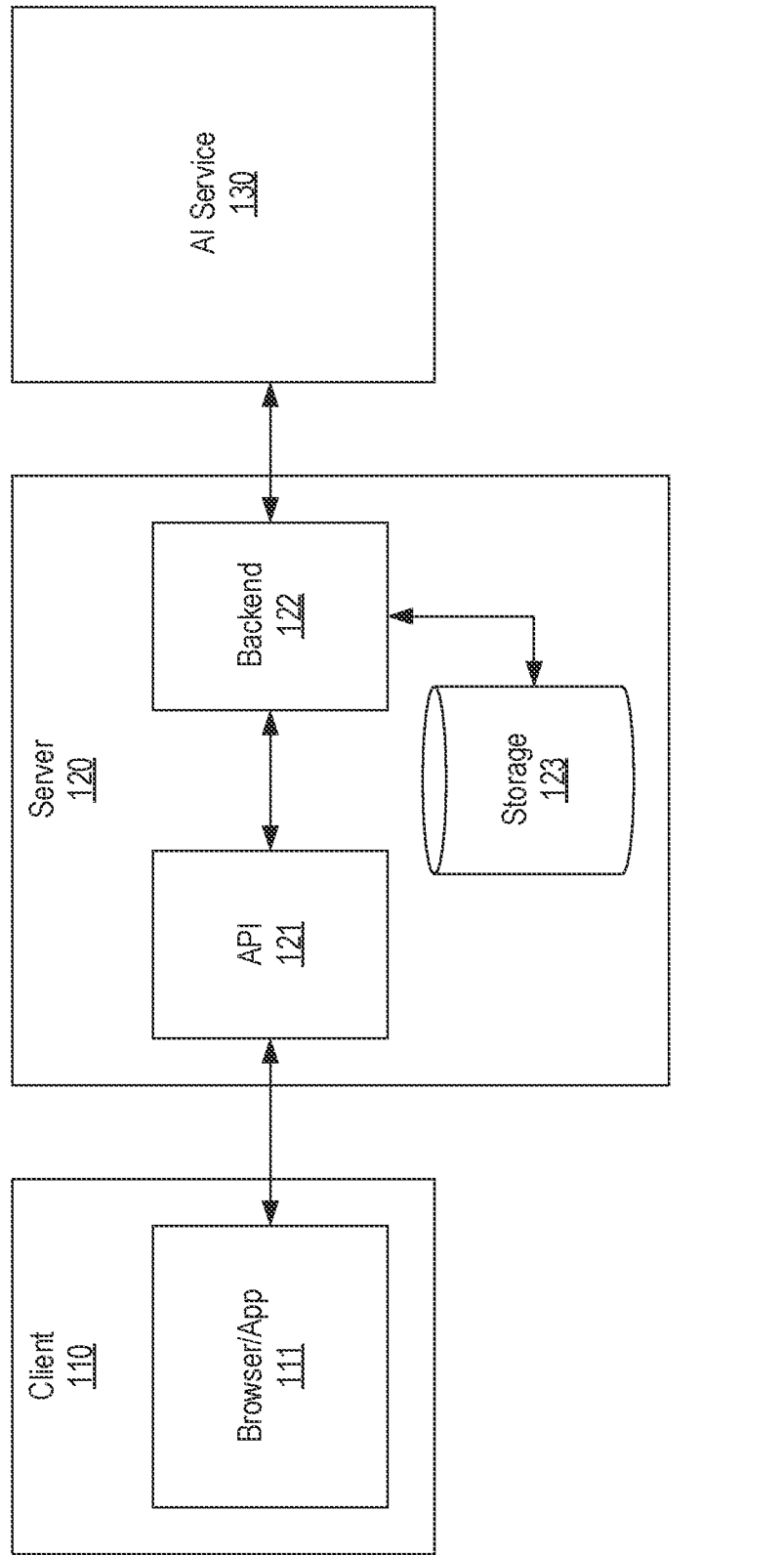
FIG. 2 provides an example of how a client and server in the example computing environment may be configured to enable one or more embodiments of the present invention to be implemented.

FIG. 2 provides an example of how client 110 and server 120 could be configured when one or more embodiments of the present invention are implemented. In this example, client 110 can employ a browser 111 to access a webpage (or employ a dedicated application) to interface with server 120 via one or more APIs 121. API 121 can leverage backend 122 to implement the functionality described herein including interfacing with AI service 130. Backend 122 can leverage data stored in storage 123 as part of implementing the functionality. API 121 should be construed as encompassing any server-side construct that enables client-side functionality to invoke functionality that server 120 provides. Although not shown, the software service that is to be configured in accordance with embodiments of the present invention can also be hosted on server 120.

FIGS. 3A-3H provide an example of how server 120 can provide a simplified software service configuration using AI in accordance with one or more embodiments of the present invention. In this example, it is assumed that a user of client 110 employs browser 111 to access a webpage 112 by which the software service configuration process can be initiated to thereby configure the software service for a particular organization or user. However, a similar process could be performed via a dedicated application.

Figure 3A:
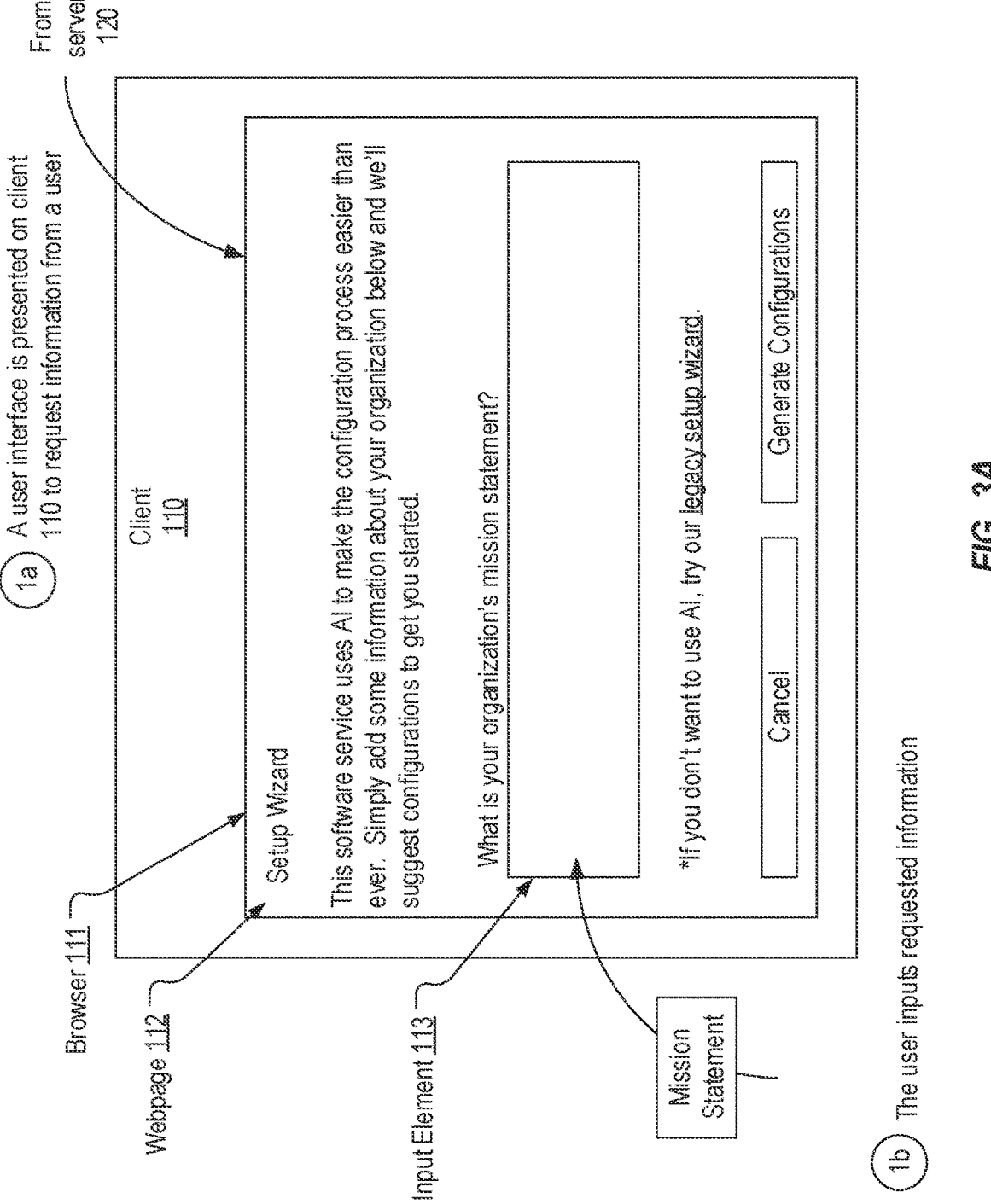
FIGS. 3A-3H provide an example of how a server can provide a simplified software service configuration using AI in accordance with one or more embodiments of the present invention.

Turning to FIG. 3A, in step 1a, a user interface, which is webpage 112 in this example, is presented on client 110. Webpage 112, which may be considered a "setup wizard" for the software service, can include an instruction to add information, such as via input element 113, to be used to generate suggested configurations for the software service. In the depicted example, this information is an organization's mission statement. However, the information could be any general information about an organization or user. Notably, the information does not constitute configurations for the software service. In step 1b, the user can input the requested information into webpage 112 such as by pasting a mission statement into input element 113. In some embodiments, the user interface could request more than one type of information such as by including more than one input element 113 to receive information from the user.

As one non-limiting example, the software service could be a behavior improvement and tracking service used by schools, such as RedCritter's CritterCoin service, in which case the requested information could be the school's mission statement. For purposes of the depicted example, it will be assumed that the user inputs a mission statement of: "Our mission is to empower students to reach their full potential and become lifelong learners and critical thinkers. We are dedicated to fostering a safe, inclusive, and engaging learning environment that inspires intellectual curiosity, creativity, and a sense of responsibility."

Figure 3B:
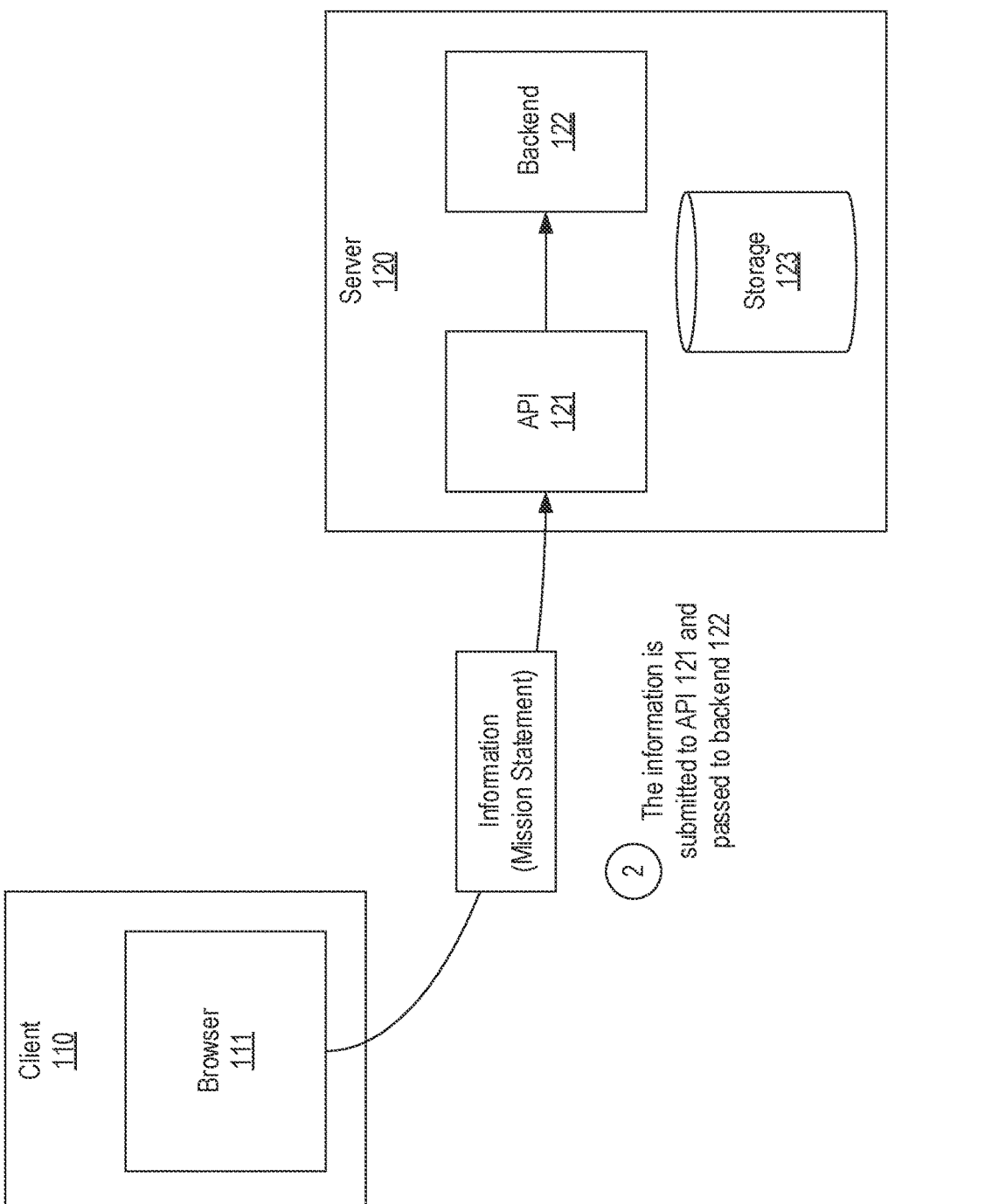

Turning to FIG. 3B, in step 2, and once the user has input the requested information, he or she can click the generate configurations button to invoke API 121 to thereby pass the information to server 120. API 121 can be configured to pass this information to backend 122.

Figure 3C:
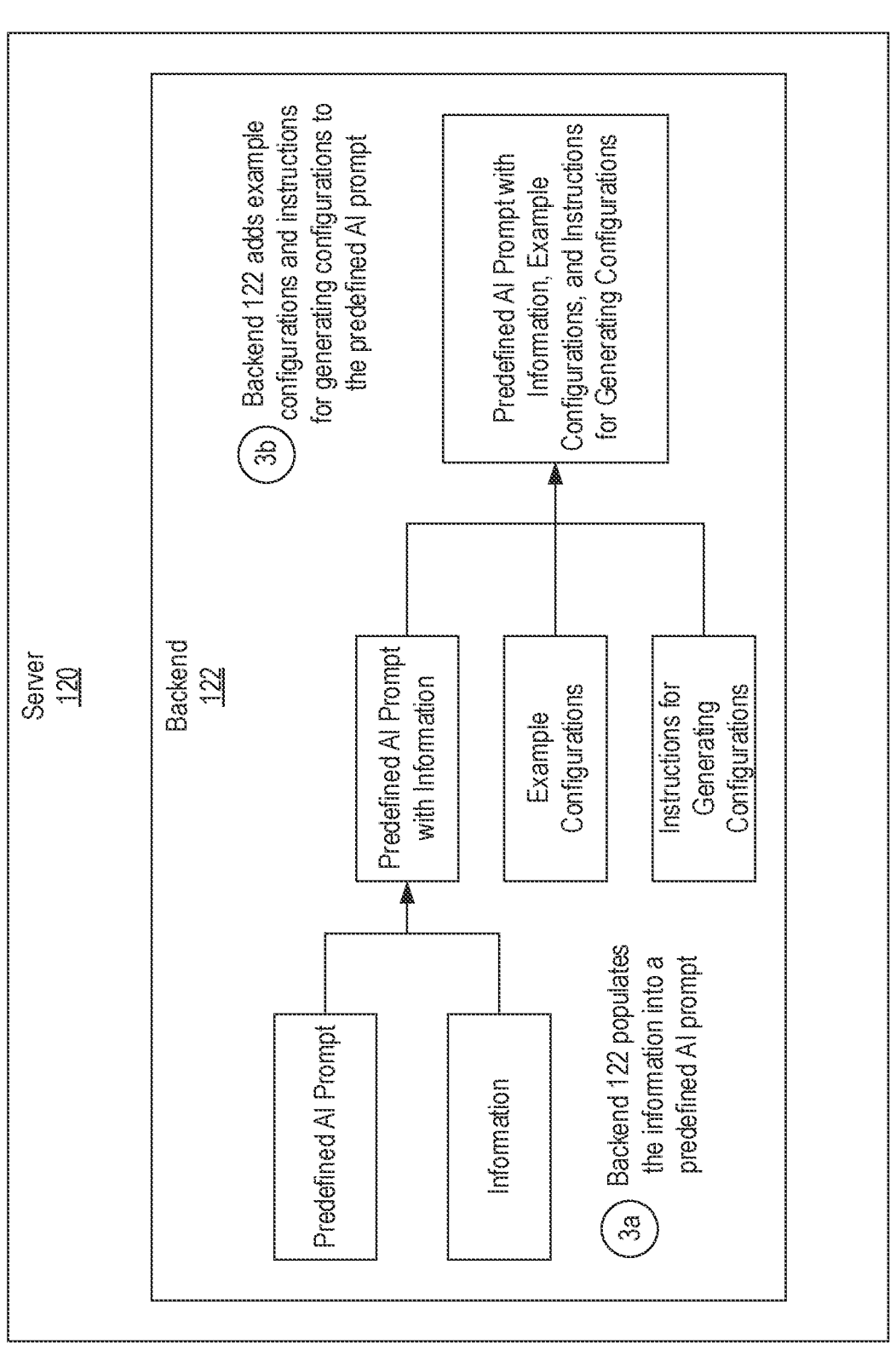

Turning to FIG. 3C, in response to receiving the information, backend 122 can be configured to generate an AI prompt. As shown, backend 122 can maintain a predefined AI prompt, example configurations, and instructions for generating configurations for this purpose. Continuing the mission statement example, the predefined AI prompt could include text of "My School's Values are." In step 3a, backend 122 can populate the information into the predefined AI prompt. For example, the school's mission statement could be appended to the text of the predefined AI prompt. Also, in step 3b, the example configurations and the instructions for generating configurations could be added to the predefined AI prompt. In some embodiments, the instructions can specify that configurations should be generated based on the example configurations and consistent with the provided information.

For example, when the software service is a behavior improvement and tracking service used by schools, the example configurations could be examples of coins, tokens or other awards that are to be made available to teachers to award to students. In such a case, the example configurations could include a name and description for each coin (e.g., coins having names of empathy, grit, respect, unity, etc. and corresponding descriptions). The instructions could specify a number of coins to generate where each coin should represent a recognition or reward that is aligned with the values identified in the submitted mission statement. The instructions could also specify that the example coins should be used as examples for generating such coins. The instructions could further specify that each coin should be given a value based on its overall importance to the values specified in the mission statement.

In some embodiments, the instructions for generating configurations may also include instructions for categorizing the configurations. For example, backend 122 could include instructions for categorizing each coin in one of a number of specified categories (e.g., categories of social, emotional, academic, creative, and effort).

In some embodiments, the configurations to be generated may also include groupings of users (e.g., groups for students to be assigned to). In such cases, the example configurations could include a list of possible groupings and the instructions for generating the configurations could include instructions for selecting a number of groupings from among the possible groupings where the selected groupings align with values specified in the information. For example, the possible groupings could be "houses" to which students may be assigned where each house is represented by an animal such that the instructions specify that animals having characteristics matching the values in the mission statement are to be selected.

Accordingly, after steps 3*a* and 3*b*, backend 122 will have built an AI prompt that incorporates the provided information and includes example configurations and instructions for generating configurations that are based on the example configurations and that align with the provided information.

Figure 3D:
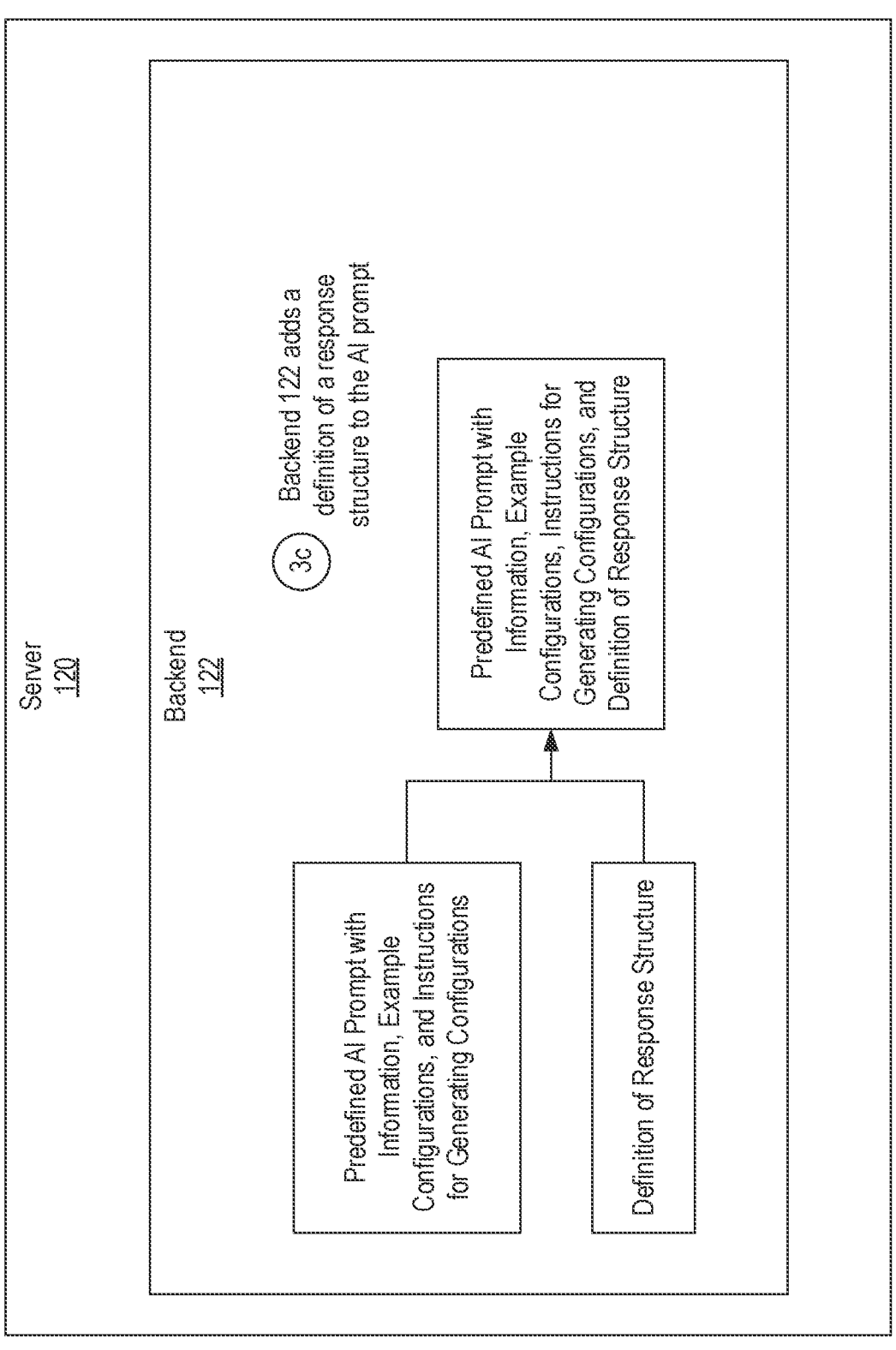

Turning to FIG. 3D, in step 3*c*, backend 122 may also add a definition of a response structure to the AI prompt. For example, the response structure could be a machine-readable format such as JSON in which the configurations should be populated. Continuing the coin and house example from above, the definition of the response structure could specify the JSON format in which the coins and houses are to be defined such as by specifying that each coin should have a type, a name, points, a description, a category, etc.

Figure 3E:
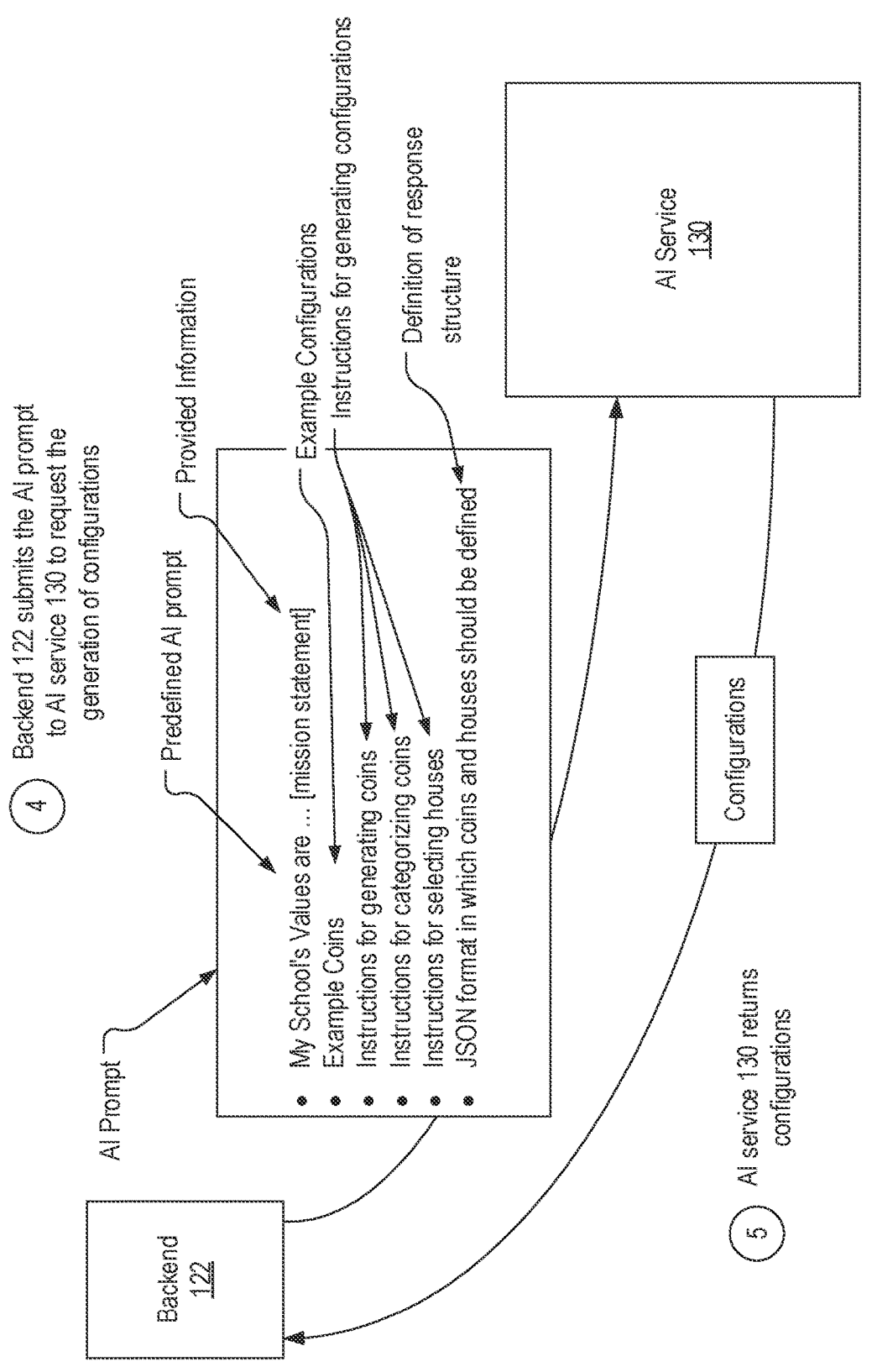

Turning to FIG. 3E, in step 4, backend 122 can submit the AI prompt to AI service 130 to request the generation of configurations for the software service based on the provided information. As shown, the AI prompt submitted to AI service 130 can include the predefined AI prompt (e.g., "My school's values are . . . "), the provided information (e.g., the school's mission statement), the example configurations (e.g., the names and descriptions of example coins), the instructions for generating the configurations (e.g., the instructions for generating and categorizing coins and for selecting houses based on the example coins and aligned with the values in the mission statement), and the definition of the response structure in which the configurations should be returned (e.g., a JSON format in which coins and houses should be defined). In step 5, backend 122 can receive the configurations that AI service 130 generates in response to the AI prompt.

Figure 3F:
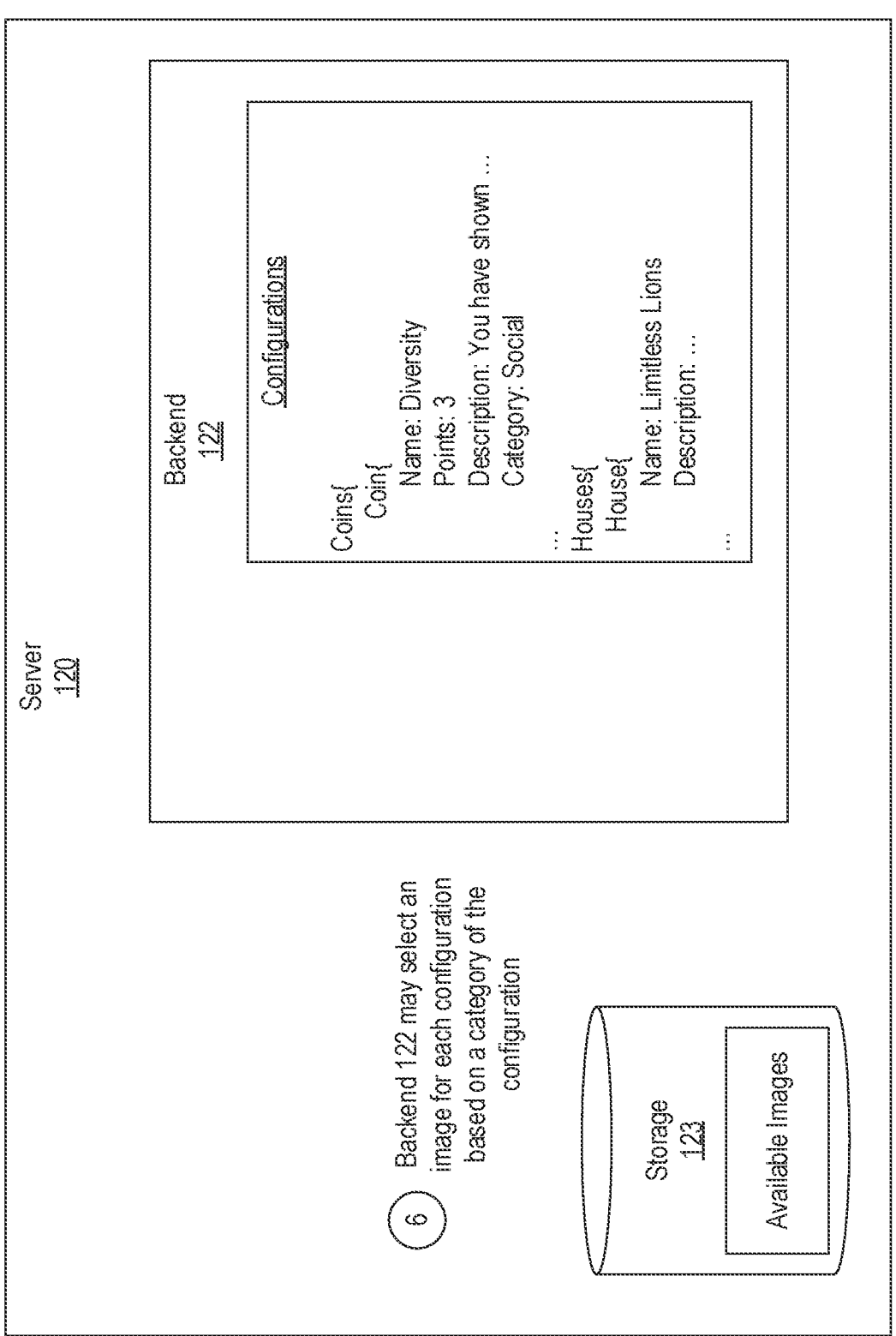

Turning to FIG. 3F, in some embodiments backend 122 may process the configurations it receives from AI service 130 and may supplement the content of such configurations. For example, in step 6, backend 122 may select an image for each configuration based on a category assigned to each configuration. In such cases, storage 123 could store available images that are each associated with a particular category and backend 122 can select from these available images (e.g., to assign an image to each coin).

Figure 3G:
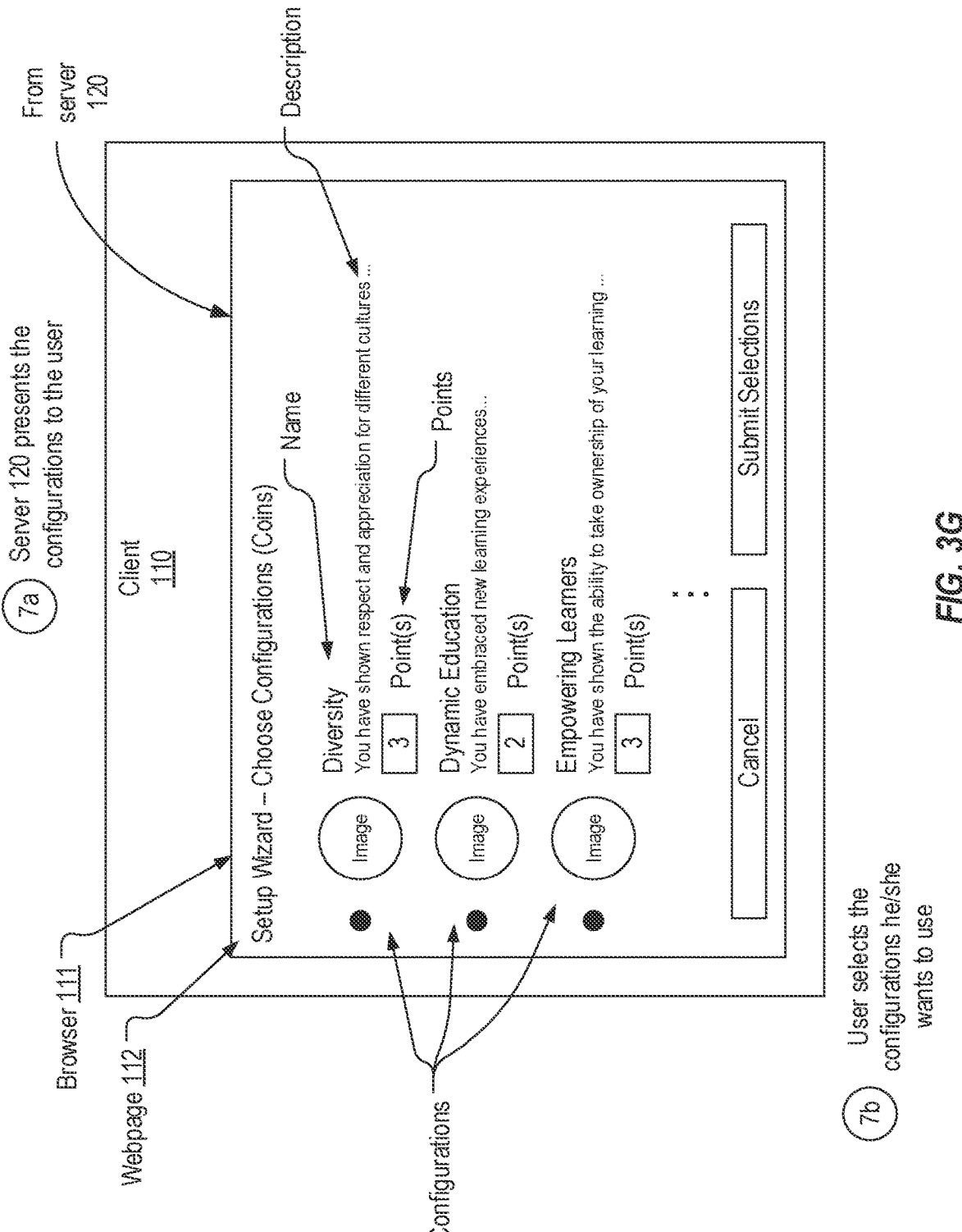

Turning to FIG. 3G, in step 7*a*, server 120 can present the configurations to the user. For example, FIG. 3G shows that webpage 112 has been updated to present a number of coins with their name, description and points as generated by AI service 130 in response to the AI prompt and with the images selected by server 120 based on the category assigned to each coin. Webpage 112 is configured to allow the user to select which of the configurations he/she desires to use. Accordingly, in step 7*b*, the user selects the configurations and submits them back to server 120 via API 121. Although not shown in FIG. 3G, in the coin and house example, a similar interface could be presented to the user to allow the user to review and select the houses. In some embodiments, server 120 may present the configurations in a manner that allows the user to edit them. For example, the user could change the name, description, image and/or points of the AI-generated configuration for a coin and/or the name of the AI-selected houses.

In this example, it is assumed that the user selects all of the configurations (e.g., all of the coins and houses). However, in some cases, the user may select only some or none of the configurations. In such cases, server 120 could be configured to repeat the above-described process to cause AI-service 130 to generate a different set of configurations. For example, backend 122 could perform a similar process to generate an AI prompt but could also include instructions to exclude the unselected configurations.

Figure 3H:
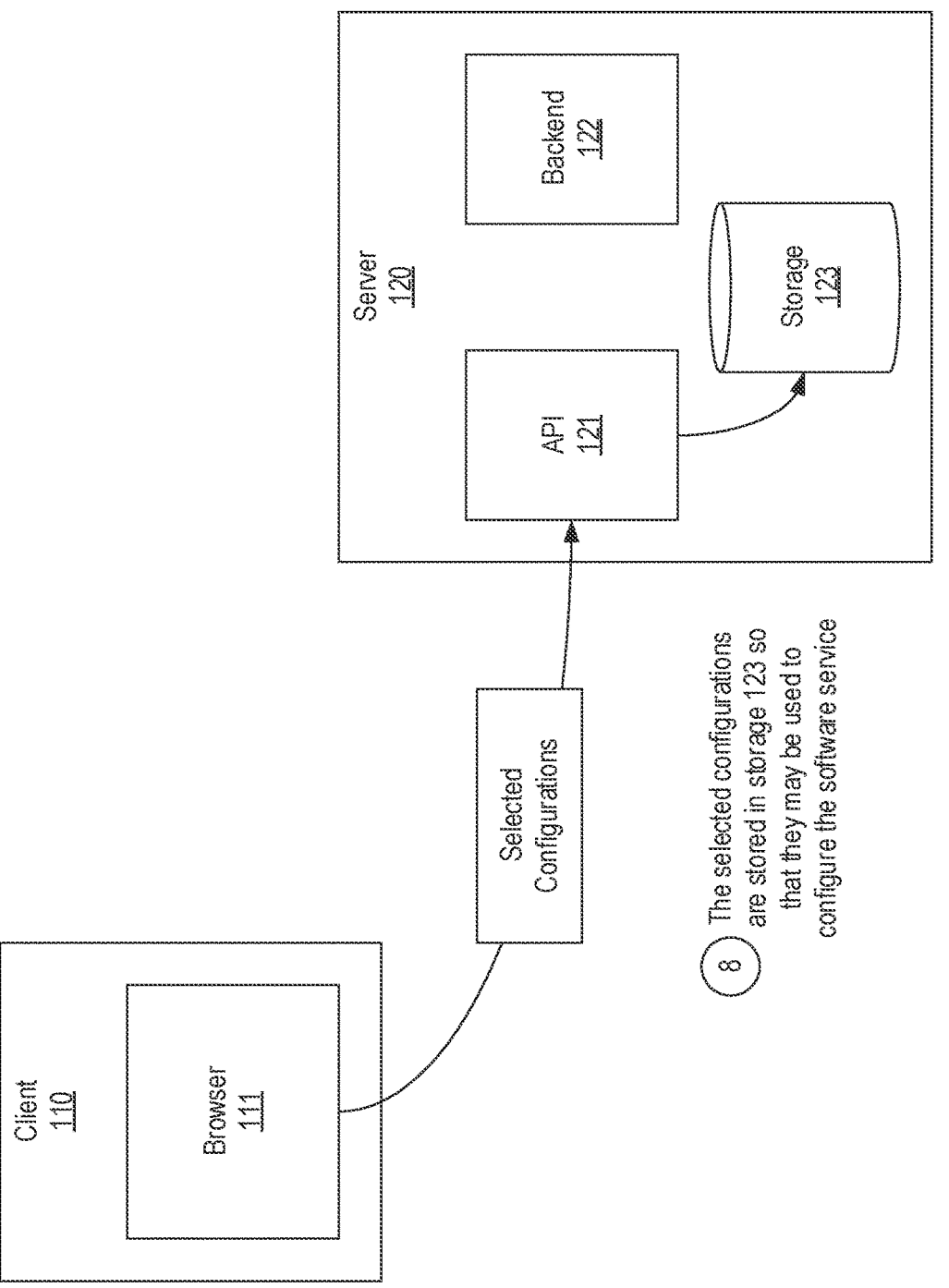

Turning to FIG. 3H, in step 8, the user's selected configurations can be stored in storage 123 where they can be used to configure the software service. For example, server 120 could create/modify data structures and/or other components of the software service in accordance with the selected configurations to customize the software service for the user/organization. Continuing the coins and houses example, once the user has selected the coins and houses to be used for the school, the software service could be configured for the school by using the houses to group the students and by making the coins available to be awarded to the students. In some embodiments, after storing and applying the configurations, server 120 may prompt the user to provide final confirmation.

As can be seen, the simplified software service configuration using AI allows the user to configure a software system by simply providing information to server 120 and then confirming the AI-generated configurations based on the provided information. By employing and populating a predefined AI prompt as part of this process, server 120 ensures that the configurations that are generated align with the provided information and are appropriate for the software service to be configured.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a software service, for providing a simplified software service configuration using artificial intelligence (AI) comprising:

presenting a user interface to an administrator of a school, the user interface requesting a mission statement that defines values for students of the school, the mission statement to be used to generate configurations for the software service;

receiving the mission statement via the user interface;

populating the mission statement into an AI prompt;

including, in the AI prompt, example configurations, the example configurations defining names and descriptions for example coins;

including, in the AI prompt, instructions for generating the configurations, the instructions specifying a number of coins to generate and specifying that the coins are to be generated based on the names and descriptions for the example coins that are defined in the example configurations, specified categories and based on the values for the students defined in the mission statement to thereby cause the coins to represent the values for the students defined in the mission statement;

including, in the AI prompt, instructions for categorizing the coins into a number of the specified categories, the specified categories including two or more of social, emotional, academic, creative and effort;

submitting the AI prompt to an AI service to request generation of the configurations for the software service based on the mission statement;

receiving the configurations, including the coins, from the AI service;

presenting the configurations to the administrator;

receiving confirmation of the configurations from the administrator; and storing and using the configurations to configure the software service.

2. The method of claim 1, wherein receiving confirmation of the configurations from the administrator comprises receiving one or more modifications to the configurations from the administrator.

3. The method of claim 1, wherein receiving confirmation of the configurations from the administrator comprises receiving a selection of less than all of the configurations.

4. The method of claim 1, wherein the configurations comprise awards that the software service is to make available to the students.

5. The method of claim 1, wherein the configurations comprise groupings of the students within the software service.

6. The method of claim 1, wherein at least two of the configurations include a name and a description that are generated by the AI service in response to the AI prompt.

7. The method of claim 1, further comprising:

including a definition of a response structure in the AI prompt, the response structure comprising a machine-readable format in which the configurations are populated.

8. The method of claim 5, wherein the instructions specify that animals having characteristics matching the values for the students defined in the mission statement are to be selected to represent the groupings of the students.

9. The method of claim 1, wherein receiving confirmation of the configurations from the administrator comprises receiving input from the administrator that changes one or more of a name, a description, an image or a point value of one or more of the coins.

10. One or more computer storage media storing computer executable instructions which when executed implement a method for providing a simplified software service configuration using artificial intelligence (AI), the method comprising:

presenting a user interface to an administrator of a school, the user interface requesting a mission statement that defines values for students of the school, the mission statement to be used to generate configurations for a software service;

receiving the mission statement via the user interface;

populating the mission statement into an AI prompt;

including, in the AI prompt, example configurations, the example configurations defining names and descriptions for example coins;

including, in the AI prompt, instructions for generating the configurations, the instructions specifying a number of coins to generate, the instructions also specifying that animals having characteristics matching the values for the students defined in the mission statement are to be selected to represent groupings of the students;

submitting the AI prompt to an AI service to request generation of the configurations for the software service based on the mission statement;

receiving the configurations, including the coins and the groupings of the students represented by the animals, from the AI service;

presenting the configurations to the administrator;

receiving confirmation of the configurations from the administrator; and storing and using the configurations to configure the software service.

11. The one or more computer storage media of claim 10, wherein the instructions specify that the coins are to be generated based on the names and descriptions for the example coins that are defined in the example configurations and based on the values for the students defined in the mission statement to thereby cause the coins to represent the values for the students defined in the mission statement.

12. The one or more computer storage media of claim 11, wherein the method further comprises:

including instructions for categorizing the coins into a number of specified categories, the specified categories including two or more of social, emotional, academic, creative and effort.

13. The one or more computer storage media of claim 10, wherein the method further comprises:

including a definition of a response structure in the AI prompt, the response structure comprising a machine-readable format in which the configurations are populated.

14. The one or more computer storage media of claim 10, wherein receiving confirmation of the configurations from the administrator comprises receiving input from the administrator that changes one or more of a name, a description, an image or a point value of one or more of the coins.

15. A method, implemented by a software service, for providing a simplified software service configuration using artificial intelligence (AI) comprising:

presenting a user interface to an administrator of a school, the user interface requesting a mission statement that defines values for students of the school, the mission statement to be used to generate configurations for the software service;

receiving the mission statement via the user interface;

populating the mission statement into an AI prompt;

including, in the AI prompt, example configurations, the example configurations defining names and descriptions for example coins;

including, in the AI prompt, instructions for generating the configurations, the instructions specifying a number of coins to generate and specifying that the coins are to be generated based on the names and descriptions for the example coins that are defined in the example configurations and based on the values for the students defined in the mission statement to thereby cause the coins to represent the values for the students defined in the mission statement;

including, in the AI prompt, instructions for categorizing the coins into a number of specified categories, the specified categories including two or more of social, emotional, academic, creative and effort;

including, in the AI prompt, instructions for defining groupings of the students within the software service and for selecting animals having characteristics matching the values for the students defined in the mission statement to represent the groupings of the students;

including, in the AI prompt, a definition of a response structure, the response structure comprising a machine-readable format in which the configurations are populated;

submitting the AI prompt to an AI service to request generation of the configurations for the software service based on the mission statement;

receiving the configurations in the response structure, including the coins and the groupings of the students, from the AI service;

presenting the configurations to the administrator;

receiving confirmation of the configurations from the administrator; and storing and using the configurations to configure the software service.

16. The method of claim 15, wherein receiving confirmation of the configurations from the administrator comprises receiving input from the administrator that changes one or more of a name, a description, an image or a point value of one or more of the coins.

\* \* \* \* \*